US012115129B2

(12) United States Patent
Cederschiöld

(10) Patent No.: US 12,115,129 B2
(45) Date of Patent: Oct. 15, 2024

(54) MEDICAL CONNECTING DEVICE

(71) Applicant: Carmel Pharma AB, Gothenburg (SE)

(72) Inventor: Alexander Cederschiöld, Gothenburg (SE)

(73) Assignee: Carmel Pharma AB, Gothenburg (SE)

( * ) Notice: Subject to any disclaimer, the term of this patent is extended or adjusted under 35 U.S.C. 154(b) by 942 days.

(21) Appl. No.: 16/599,479

(22) Filed: Oct. 11, 2019

(65) Prior Publication Data

US 2020/0038292 A1 Feb. 6, 2020

Related U.S. Application Data

(63) Continuation of application No. 15/061,027, filed on Mar. 4, 2016, now Pat. No. 10,478,382, which is a continuation of application No. 14/409,554, filed as application No. PCT/SE2012/050727 on Jun. 27, 2012, now abandoned.

(51) Int. Cl.
*A61J 1/20* (2006.01)

(52) U.S. Cl.
CPC ........... *A61J 1/2096* (2013.01); *A61J 1/2055* (2015.05); *A61J 1/2072* (2015.05); *A61J 1/201* (2015.05); *A61J 1/2051* (2015.05); *A61J 1/2082* (2015.05)

(58) Field of Classification Search
CPC ........ A61J 1/1406; A61J 1/201; A61J 1/2051; A61J 1/2055; A61J 1/2072; A61J 1/3082; A61J 1/2096
See application file for complete search history.

(56) References Cited

U.S. PATENT DOCUMENTS 4,564,054 A 1/1986 Gustavsson
4,576,211 A 3/1986 Valentini et al.
5,647,845 A 7/1997 Haber et al.
6,071,270 A * 6/2000 Fowles ................ A61J 1/2089 137/614.04
6,258,078 B1 7/2001 Thilly
6,715,520 B2 4/2004 Andreasson et al.
7,540,863 B2 6/2009 Haindl
8,196,614 B2 6/2012 Kriheli
(Continued)

FOREIGN PATENT DOCUMENTS

CN 102481229 A 5/2012
EP 1430864 A1 6/2004
(Continued)

*Primary Examiner* — Benjamin J Klein
(74) *Attorney, Agent, or Firm* — The Webb Law Firm

(57) ABSTRACT

A bottle connector for use in a medical fluid transfer arrangement, the bottle connector having an axial direction and a radial direction and comprising a first part and a second part, the first part comprising a hollow piercing member comprising an inner gas channel and extending in the axial direction beyond the end of the first part. The second part comprises a bottle coupling member, for coupling the bottle connector to a medical bottle. The first and second parts are pre-connected and are concentrically arranged with respect to each other and the bottle connector has a transport configuration with a first, maximum length in which the piercing member is completely located within the bottle connector, and a fluid transfer configuration with a second, minimum length.

17 Claims, 6 Drawing Sheets

(56) References Cited

U.S. PATENT DOCUMENTS

| | | | | |
|---|---|---|---|---|
| 2003/0070726 | A1 * | 4/2003 | Andreasson .......... | A61J 1/2096 141/329 |
| 2003/0107628 | A1 | 6/2003 | Fowles et al. | |
| 2007/0106244 | A1 | 5/2007 | Mosler et al. | |
| 2009/0069783 | A1 * | 3/2009 | Ellstrom ............... | A61J 1/2089 604/414 |
| 2010/0168712 | A1 | 7/2010 | Tuckwell et al. | |
| 2012/0179129 | A1 | 7/2012 | Imai | |

FOREIGN PATENT DOCUMENTS

| | | | |
|---|---|---|---|
| JP | 2001508680 | A | 7/2001 |
| JP | 2005504609 | A | 2/2005 |
| JP | 2007525264 | A | 9/2007 |
| JP | 2010528809 | A | 8/2010 |
| WO | 9927886 | A1 | 6/1999 |
| WO | 2008153459 | A1 | 12/2008 |
| WO | 2010069359 | A1 | 6/2010 |
| WO | 2011068190 | A1 | 4/2013 |

* cited by examiner

MEDICAL CONNECTING DEVICE

CROSS-REFERENCE TO RELATED APPLICATION

This application is a continuation of U.S. patent application Ser. No. 15/061,027, which is a continuation of U.S. patent application Ser. No. 14/409,554, which is a 371 national phase of International Patent Application No. PCT/SE2012/050727 filed on Jun. 27, 2012, the disclosures of which are hereby incorporated in their entirety by reference.

BACKGROUND OF THE INVENTION

Field of the Invention

The invention relates to a connecting device for use in a medical fluid transfer arrangement, the connecting device comprising first and second generally cylindrical parts, the first part comprising a hollow piercing member comprising an inner channel and the second part comprising a bottle coupling member. The invention also concerns a method for applying the connecting device to a medical bottle.

Description of Related Art

A major problem in relation to drug preparation, drug administration or other similar handling of pharmaceuticals is the risk of medical and pharmacological staff being exposed to drugs or solvents which may escape into ambient air. The problem is particularly serious when hazardous drugs such as cytotoxins, antiviral drugs, antibiotics, and radiopharmaceuticals are concerned. It has been found that safety boxes according to the present technology often provide insufficient environmental protection. For example, cytotoxins can evaporate at room temperature. Safety boxes and cabinets according to the present technology are provided with filters for filtration of circulating and exhaust air. Conventional or HEPA (High-Efficiency Particulate Arresting) filters are able to trap aerosols and particles, but no evaporated substances. Furthermore, aerosols and other particles which are initially trapped in the filters can transform into their gas phase and be released into the ambient air. For these reasons, systems for handling and administrating drugs and other medical substances under improved safer conditions have been developed.

U.S. Pat. No. 4,564,054 (Gustavsson) discloses a fluid transfer device for preventing air contamination when transferring a substance from a first vessel to a second vessel. The device is attached or connectible to the vessel and comprises a first member, in which a piercing member, e.g. a needle, provided with a passage is enclosed. The first member has a sealing member, e.g. a membrane, through which the needle can be passed. The device further comprises a second chamber, which is detachably connectible to the first member and which also has a sealing member, e.g. a membrane. When the first and second members are connected to each other, the two sealing members are located in position with respect to each other so that they can be penetrated by the piercing member which is movable with respect to the sealing member.

The sealing members are liquid and gas-proof barriers having the ability of sealing tightly after penetration and retraction of the piercing member to prevent leakage of liquid, as well as gas components. In another system for handling drugs and other medical substances, International Patent Publication No. WO 99/27886 A1 (Fowles et al.) discloses a connector device for establishing fluid communication between a first container and a second container. The connector device has a first sleeve member with a first and second end. The first sleeve member has a first attaching member at the first end that is adapted to attach to the first container. The connector device further has a second sleeve member with a first and second end. The second sleeve member is combinable with the first sleeve member and movable with respect thereto from an inactivated position to an activated position, wherein the second sleeve member has a second attaching member at the second end adapted to attach the second sleeve member to the second container.

The connector device disclosed in WO 99/27886 A1 further comprises a first and second piercing member projecting from one of the first and second sleeve members for providing a fluid flow path from the first container to the second container. The connector device further provides a means for independently hermetically sealing the first and second members.

Still a further system for handling hazardous drugs is disclosed in US 2003/0070726 A1 (Andreasson et al). US 2003/0070726 A1 refers to a fluid transfer assembly comprising a bottle connector with a hollow piercing needle, a drug bottle with a bottle closure, and a neck element having locking members for irreversible coupling of the connector to the bottle neck. The neck element and the connector have means for irreversible interconnection and interacting guiding members for directing the hollow needle to penetrate the bottle closure at a predetermined angle when establishing a fluid transfer line through the connector and into the drug bottle. Despite the efforts that have been made so far in order to improve safety when handling hazardous substances, and in particular hazardous drugs, there is still a need for further improvement. An object of the invention is, therefore, to provide a connecting device in a fluid transfer arrangement allowing the use of longer transfer needles.

SUMMARY OF THE INVENTION

In accordance with the invention is offered a connecting device for use in a medical fluid transfer arrangement, the connecting device having an axial direction and a radial direction and comprising a first generally cylindrical part having a first end and a second end and a second generally cylindrical part having a first end and a second end, the first part comprising a hollow piercing member comprising an inner channel and extending in the axial direction from the first end of the first part beyond the second end of the first part and the second part comprising a bottle coupling member, for coupling the connecting device to a medical bottle, wherein the first and second parts are interconnected and are concentrically arranged with respect to each other, the connecting device having a transport configuration in which the second end of the first part is located at the first end of the second part and the piercing member is completely located within the connecting device and a fluid transfer configuration in which the first end of the first part is located at the first end of the second part and the second end of the first part is located at the second end of the second part.

When the connecting device is in in the transport configuration, the radial overlap between the first and the second part is minimal resulting in the connecting device having a maximal length in the axial direction. When the connecting device has been transformed into the fluid transfer configuration it has a maximal, radial overlap between the first and second parts, resulting in the connecting device having a minimal length in the axial direction. Transformation of the connecting device from the transport configuration to the fluid transfer configuration takes place by axially sliding the first and second parts relative to each other so that the overlap between the parts increases in a telescopic manner.

An important feature of the connecting device in accordance with the invention is that when the connecting device is in the transport configuration, the second part extends below any piercing member or piercing members so that the piercing members are completely shielded inside the connecting device. This means that the combined first and second parts of the connecting device protect the piercing member or piercing members and prevent inadvertent contact with objects on the outside of the connecting device. A further advantage with the extended configuration adopted by the connecting device in the transport configuration is that it ascertains alignment of the piercing member with a sealing member in a medical bottle so that the piercing member is properly aligned even before it is brought into contact with the sealing member. Thereby, the piercing member will always penetrate the sealing member in a controlled and predetermined manner. The connecting device, according to the invention, allows the use of longer piercing members so that all types of bottle stoppers and other sealing members in medical containers may be completely penetrated by the piercing member when the connecting device is coupled to the medical container. In particular, when forming part of a closed system pressure equalizing bottle adapter comprising a pressure equalizing member, the connecting device minimizes the risk of air transfer by ascertaining that the hollow piercing member reaches down all the way through the seal in the bottle opening and into the bottle ensuring proper function of the pressure equalizing member.

The second part of the connecting device may be arranged inside of the first part in the radial direction. When the parts are arranged in this manner, transformation of the connecting device from the transport configuration to the fluid transfer configuration is performed by sliding the first part over the second part or by pushing the second part into the first part so that the second part comes to reside inside of the first part when the connecting device is in the fluid transfer configuration.

Alternatively, the second part may be arranged outside the first part in the radial direction. When the parts are arranged in this manner, transformation of the connecting device from the transport configuration to the fluid transfer configuration is performed by pushing the first part into the second part or by sliding the second part over the first part so that the first part comes to reside with a major portion inside of the second part when the connecting device is in the fluid transfer configuration.

Transformation of the connecting device from the transport configuration to the fluid transfer configuration would normally take place after the connecting device has been secured to a medical bottle by means of the bottle coupling member on the second part of the connecting device. The first part of the connecting device is subsequently pressed axially in a direction towards the bottle opening causing the first part to slide down over the second part or into the second part depending on whether the first part is arranged on the outside of the second part or on the inside of the second part. At the same time, the piercing member which is arranged axially on the first part, is brought down into the medical bottle, penetrating any seal in the bottle opening as the length, i.e. the axial extension of the connecting device, is gradually reduced.

The connecting device preferably comprises a locking member for releasable locking the connecting device in the transport configuration, so that unintentional compression of the connecting device in the axial direction is avoided. The releasable locking member may be a bayonet fitting, snap-lock, locking tab, breakable connection, etc. as known in the art. The locking member may be an integral part of the connecting device, or may be a separate member such as a locking tape, a clamp, or similar, which is removed to activate the telescoping action of the connecting device. Combinations of different types of locking means are also contemplated within the scope of the invention.

Furthermore, the connecting device preferably comprises means for interlocking the first part and the second part when the connecting device is in the fluid transfer configuration. The interlocking means may be a mating locking arrangement with a locking element on the first part of the connecting device arranged to engage with a locking element on the second part of the connecting device. Such mating locking arrangements include bayonet fittings, snap-locks, locking tabs, etc. as known in the art. Combinations of different types of locking elements are also contemplated within the scope of the invention. The interlocking means may be of the reversible type that is designed so that it can be reopened without destroying or damaging the connecting device. Alternative, the interlocking means may be of the type rendering interlocking of the parts irreversible, implying that it cannot be opened without simultaneously damaging or destroying the connecting device.

In a connecting device according to the invention, the first part may carry a barrier member which is arranged at the first end of the first part.

The second part of the connecting device may comprise means for connecting the second part to a bottle. The means for connecting the first part to a medical fluid transfer device may comprise a bayonet fitting. The first and second parts of the connecting device may comprise cooperating guiding members for guiding the piercing member through a bottle seal at a predetermined angle, such as at a predetermined angle of from 85° to 95° and preferably 90°.

The connecting device may further comprise a pressure equalizing member. The pressure equalizing member may be of any kind as known in the art. It may be preferred that the pressure equalizing member comprises a pressure regulating chamber having a pressure adapting volume and being in fluid communication with a gas channel in the piercing member, or in a separate piercing member and preferably comprising a filter between the pressure regulating chamber and the air channel in the piercing member.

The piercing member in the connecting device is preferably aligned with a central axis through the connecting device and is placed along the central axis or not more than 3 mm from the central axis, as measured in the radial direction of the connecting device, in a method for applying a connecting device according the invention to a medical bottle having a bottle neck with a bottle opening and a sealing member in the bottle opening. The method may include the steps of: a) applying the second part of the connecting device over the bottle neck; while keeping the connecting device in the transport configuration; b) coupling the connecting device to the bottle neck by means of the bottle coupling member on the second part; and c) bringing the piercing member on the first part of the connecting device to penetrate the sealing member in the bottle opening by telescopically sliding the first part in relation to the second part and bringing the connecting device to assume the fluid transfer configuration.

The fluid transfer assembly according to the invention comprises a bottle connector and a drug bottle. The expression "drug bottle" as used herein refers to any container which is leakage proof and otherwise suitable for the purpose in question. Accordingly, the drug bottle can be a bottle or vial of a conventional type utilized for drugs or medical fluids intended to be administered to a human patient or an animal. Preferably, the drug bottle has only one sealed opening, and is made of a solid, rigid material, such as glass.

Furthermore, it is preferred that the drug bottle has no displaceable bottom, flexible walls, or the like, which might increase the risk of hazardous leakage into the environment.

As used herein, the expression "neck" should be understood as a conventional bottle or vial neck, or as a protruding portion of the fluid container with an edge, shoulder, protrusion, or the like, which fulfills the same function. The expression "opening" should be understood as a passageway into the interior of the bottle, whereas the expression "closure" refers to any leakage-proof membrane, film foil, seal, or the like, made of a material which can be punctured by a hollow needle and which otherwise is suitable for the purpose. As used herein, a rubber stopper is a closing member for a drug bottle such as a medical vial. The rubber stopper may be pierced by a needle, e.g. for removal of a quantity of the liquid from the vial. "Stoppers" or closures for receptacles are defined by International Standards such as ISO 8362-5 and ISO 8536-2:20110. The barrier members used in the bottle connector disclosed herein are flexible and elastically compressible liquid and gas-proof membranes, also known as sealing members or septa, which have the ability of sealing tightly after penetration and retraction of a piercing member in order to prevent escape of liquid as well as gas components. Such materials are generally referred to as being "flexible", "expandable", and "compressible". As used in this document, these expressions are intended to mean materials that are capable of being elastically flexed, expanded, or compressed under the influence of external forces and that will substantially return to their original state once the external forces are removed. A "flexible material" is intended to mean a material that can easily be folded or twisted, or bent by hand, or a material that may be flexed and/or bent repeatedly without rupture or the development of visible defects in accordance with the definition in ISO 472:1999 "Plastics:—Vocabulary".

The barrier members used with the connecting devices of the invention may be made from medical grade elastomeric polymer materials as known in the art. Such materials include silicone elastomers, isoprene, natural elastomers, and thermoplastic elastomeric polymer materials (TPE). Thermoplastic elastomers include Styrene Block Copolymers (TPS), Thermoplastic Polyolefins (TPO), Thermoplastic polyurethanes (TPU), copolyesters, and polyether block amides.

By "elastomer" as used herein, is implied a macromolecular material which returns rapidly to its initial dimension and shape after substantial deformation by a weak stress and release of the stress. The definition applies under room temperature test conditions and is found in ISO 472:1999 "Plastics—Vocabulary".

The parts of the bottle connector may be molded from comparatively rigid plastic as is known in the art. A rigid plastic material for the purpose of the invention is a material that will generally retain its shape during normal use and that will not be permanently flexed or deformed by the forces required to manipulate the transfer and connecting device between the transport configuration and the fluid transfer configuration or by the forces required to form a connection with a bottle or other medical device, such as a syringe. However, the rigid plastic materials that are useful in the bottle connector, according to the invention, have the ability to elastically flex and deform sufficiently to facilitate assembly of the bottle connector and to allow the bottle connector to be connected to a bottle or other medical device.

Thermoplastic materials such as polyethylene or polypropylene; acrylonitrile butadiene styrene (ABS), polycarbonate, polyester, or any other suitable materials, may be used for making the connecting device of the invention. When using injection molding techniques to form the connecting device, the process may be a monocomponent or multicomponent injection molding process allowing different parts of the protective cap to be formed integrally from materials having different properties, such as different extensibility, different flexibility, etc. A multicomponent injection molding process is a process using more than one component, i.e. two or more components. As used herein, the expression "hollow needle" refers to any suitable piercing device made of, e.g. a metal or polymer, which is provided with an appropriate passageway.

As used herein, the expression "irreversible coupling" means that the neck element in normal, intended use cannot be removed from the drug bottle unintentionally, and without the use of excessive force.

The terms "pre-connected" or "pre-assembled" as used herein refer to parts of a device that have been connected or assembled by a manufacturer and are delivered to a user in a connected or assembled state, as opposed to parts that are connected o assembled by the user.

DESCRIPTION OF THE INVENTION

Figure 1:
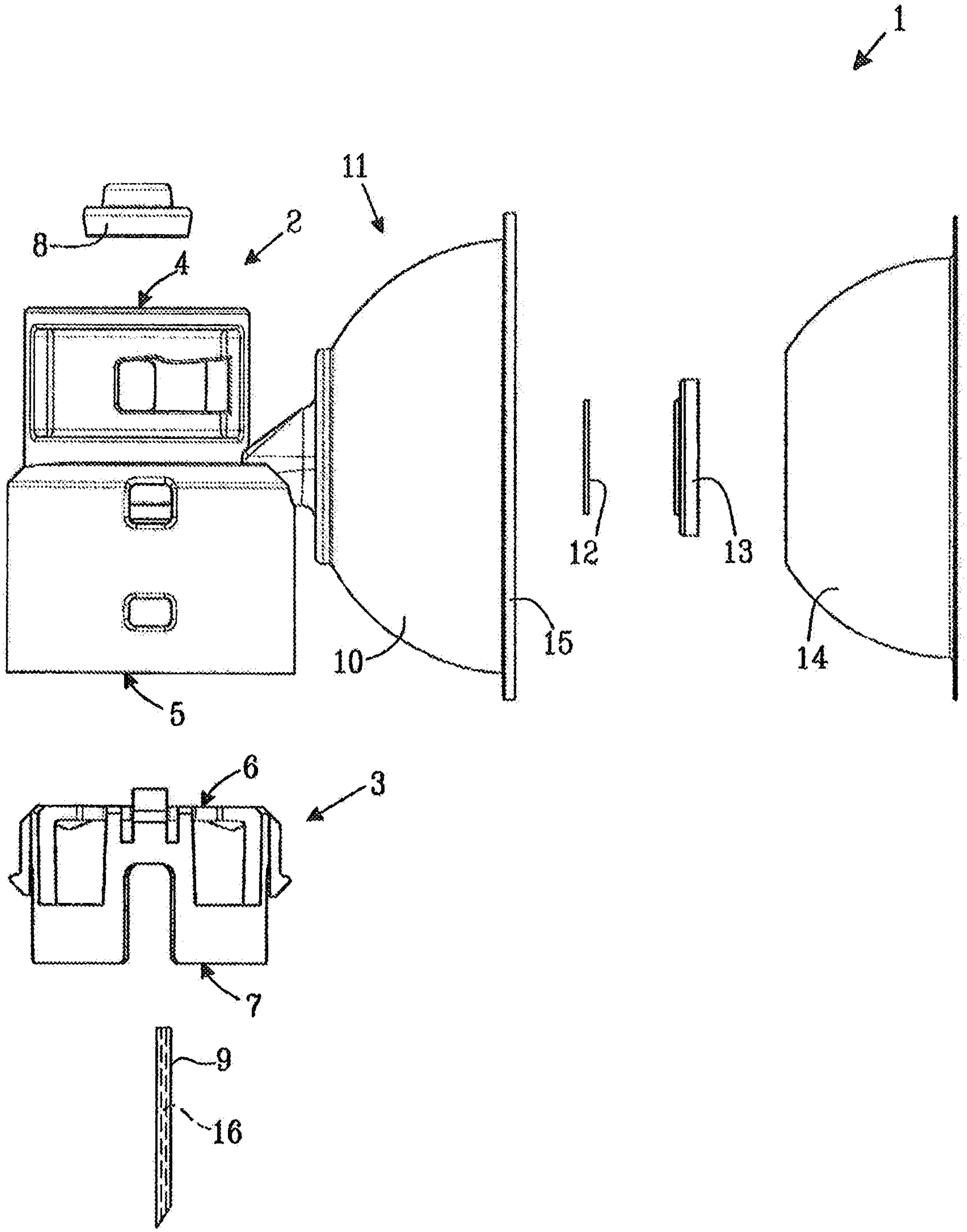
FIG. 1 shows an exploded view of a bottle connector according to the invention.

FIG. 1 shows a bottle connector 1 according to the invention with the parts separated. The bottle connector 1, as shown in FIG. 1, comprises a first generally cylindrical part 2 with a first end 4 and a second end 5 and a second generally cylindrical part 3 with a first end 5 and a second end 7. The bottle connector further comprises a barrier member 8 and a piercing member. A parabola-shaped gas chamber 10 belonging to a pressure equalizing member 11 is shown to be connected to the first part 2 of the bottle connector 1. Further, parts of the pressure equalizing member 11 are a filter 12, a filter holder 3, and a flexible wall member 14.

The barrier member 8 is shown to be generally disc-shaped, with a thicker central portion and thinner peripheral portion. The barrier member may be a type of sealing membrane or septum as defined herein.

When assembled, the pressure equalizing member 11 is arranged to adapt its volume in response to a change in gas pressure. The volume of the pressure equalizing member 11 may be changed by expanding or collapsing the flexible wall member 14. The flexible wall member 14 may be a thin film material, e.g. a thin transparent film that is welded or adhesively attached to the outer rim 5 of the parabola-shaped gas chamber 10 so as to form a gas-tight seal between the parabola-shaped gas chamber 10 and the flexible wall member 14. Any gas passing into the gas container formed between the parabola-shape gas chamber 10 and the flexible wall member 14 will pass through the filter 12 in the filter holder 13. The filter 12 may be any suitable commercially available filter, such as a particulate air filter having a pore size of 0.2 pm. Although the filter holder 13 is shown in FIG. 1 as being separate from the parabola-shaped gas chamber 10, it may be integrally formed with the parabola-shaped gas chamber 10 by a blow moulding or vacuum forming process. If formed as a separate component, it may be attached to the parabola-shaped gas chamber 10 by welding, such as by ultrasonic welding as known in the art. Adhesive attachments or mechanical fittings are also conceivable within the scope of the invention. The filter 12 may be attached to the filter holder 13 by means of adhesive or welding or may be mechanically held, in the filter holder 13.

Figure 2A:
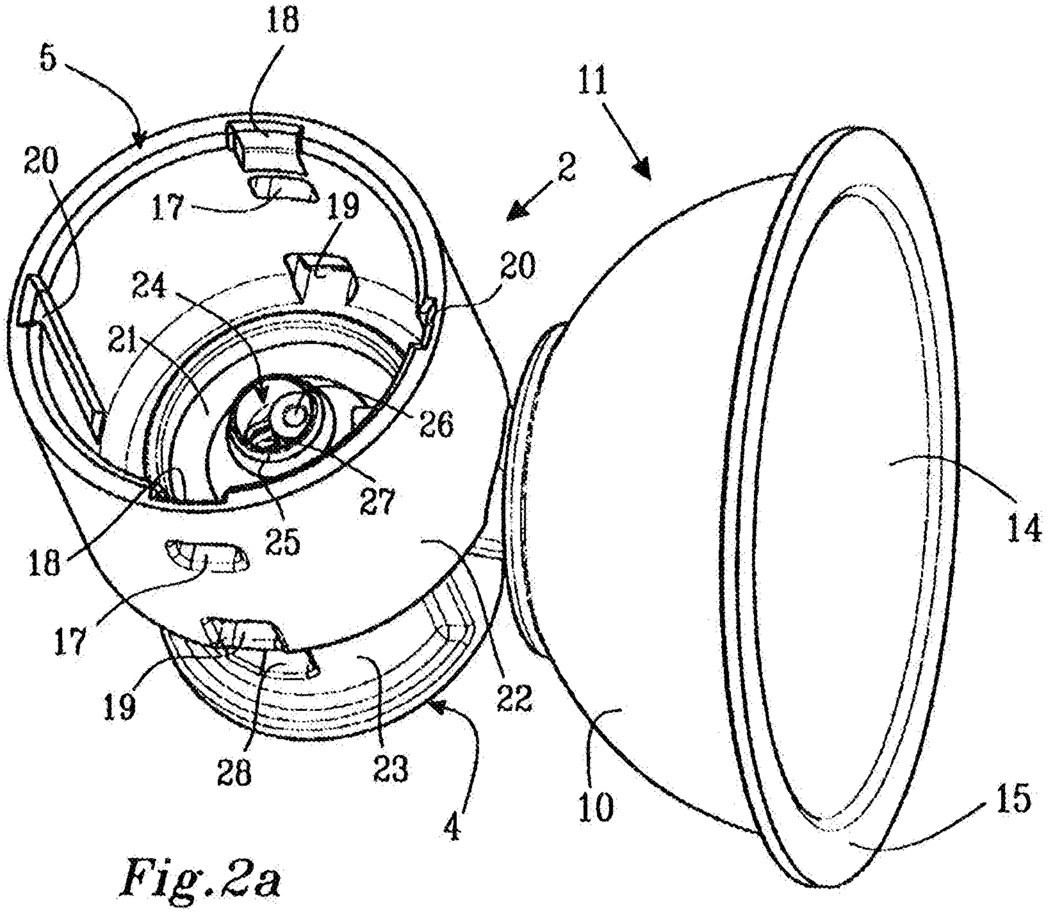
FIG. 2*a* shows a perspective view of a first part of the bottle connector in FIG. 1.
Figure 6:
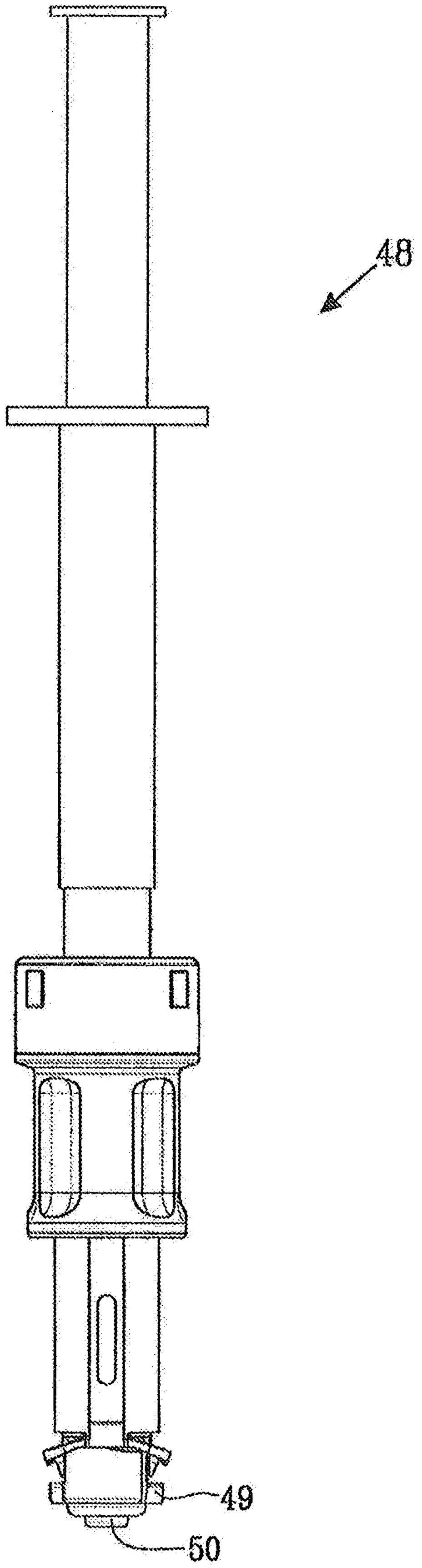
FIG. 6 shows an example of a medical device that may be used with the bottle connector of FIG. 1.

The particular pressure equalizing member 11 shown in the figures should not be considered to be limiting to the invention. Accordingly, the pressure equalizing member 11 may take any form as known in the art, including non-closed arrangements, although a closed-chamber pressure equalizing member is highly preferred when handling hazardous substances. One example of a suitable pressure equalizing member is found in International Patent Publication No. WO 2008/153459 A1. The piercing member 9 has an internal channel 16 which is in fluid communication with the pressure equalizing member 11 when the bottle connector 1 is assembled. The internal channel 16 allows gas and air to pass into the volume-changing gas container formed between the parabola-shaped gas chamber 10 and the flexible wall member 14. FIG. 2*a* shows the first part 2 of the bottle connector 1 in FIG. 1 seen from the second end 5 and with the parts of the pressure equalizing member 11 assembled but without the piercing member 9. The first part 2 of the bottle connector 1 has a generally cylindrical shape with a larger diameter portion 22 at the second end 5 and a smaller diameter portion 23 at the first end 4. The second wider end 5 is adapted for connection with the second part 3 of the bottle connector 1 and the first smaller end 4 is adapted for connection with a medical device. In the example shown in the figures, the medical device is a syringe, as shown in FIG. 6.

In order to enable coupling between the first part 2 and the second part 3 of the bottle connector 1, the first part is provided with first locking openings 17 arranged opposite each other in the wall of the first part 2 and constituting receiving members or female members of a snaplock arrangement allowing the first and second parts 2, 3 to be releasably locked in the first configuration constituting a transport configuration. The first locking openings 17 are placed at a distance from the edge of the second end 5 of the first part 2, leaving room between the first locking openings 17 and the edge of the first part 2 at the second 3 end for a guiding groove 18.

A second set of receiving members in the form of second locking openings 19 are arranged at the junction between the larger diameter portion 22 and the smaller diameter portion 23 of the first part 2 of the bottle connector 1. The second locking openings 19 do also form part of the snaplock arrangement between the first and second parts 2, 3 of the bottle connector 1. The second locking openings 19 are used to lock the first and second parts 2, 3 in a second configuration constituting a fluid transfer configuration. Although the shown arrangement with opposing coupling members may be preferred, any coupling arrangement allowing telescopic movement without simultaneous rotation between the first and second parts 2, 3 may be used within the scope of the invention. Accordingly, each part 2, 3 of the bottle connector 1 may comprise one or more coupling members such as 1-6 coupling members. If more than one coupling member is used, the coupling members are preferably symmetrically arranged in the walls of the bottle connector 1. Moreover, the locking arrangement between the parts 2, 3 may comprise any one or more of locking means such as bayonet fittings, stop notches, a stop knobs, a snap locks, etc., as known in the art.

The first part 2 of the bottle connector 1 further comprises grooves 20 constituting female guiding means for guiding the second part 3 info the first part 2.

The first part 2 of the bottle connector 1 is further shown to have an intermediate wall 21 between the larger diameter portion 22 at the second end 5 and the smaller diameter portion 23 at the first end 4. A central opening 24 bordered by a circular sealing flange 25 is arranged in the intermediate wall 21. The central opening 24 accommodates both a socket 26 for the piercing member 9 and a channel 27 for an external piercing member, such as a needle in a syringe. The circular sealing flange 25 ascertains that a tight seal is created around the piercing site when the bottle connector 1 is applied to a medical bottle. Alternative sealing arrangements include the use of a small diameter spike having two internal channels for fluid and gas transfer. A further feature of the first part 2 of the bottle connector 1 as shown in FIG. 2*a* is a female part 28 of a bayonet fitting arranged in the smaller diameter portion 23 of the first part 2 for coupling of a syringe, or similar device to the bottle connector 1. It is to be noted that both the smaller diameter portion 23 of the first part and the bayonet fitting are optional features of a bottle connector in accordance with the invention.

Depending on the type of medical device to be coupled to the first end 4 of the first part 2, the coupling arrangement at the first end 4 may be different from the bayonet fitting shown in the figures. Accordingly, any type of threaded coupling, bayonet fitting, snap-lock, locking ring, slide fitting, clamp, etc. may be used, as known in the art. Furthermore, more than one locking element of the same or different construction may be used in combination to create a coupling between the bottle connector 1 and a medical device. When the bottle connector 1 has been connected to a first medical device, it can subsequently be connected with a second medical device carrying a piercing member 9. Consequently, the medical device that is connected with the bottle connector 1 at the first end 4 of the first part 2 of the bottle connector 1 may be a piercing device such as a syringe, another connecting device, a needle protection device, etc.

Figure 2B:
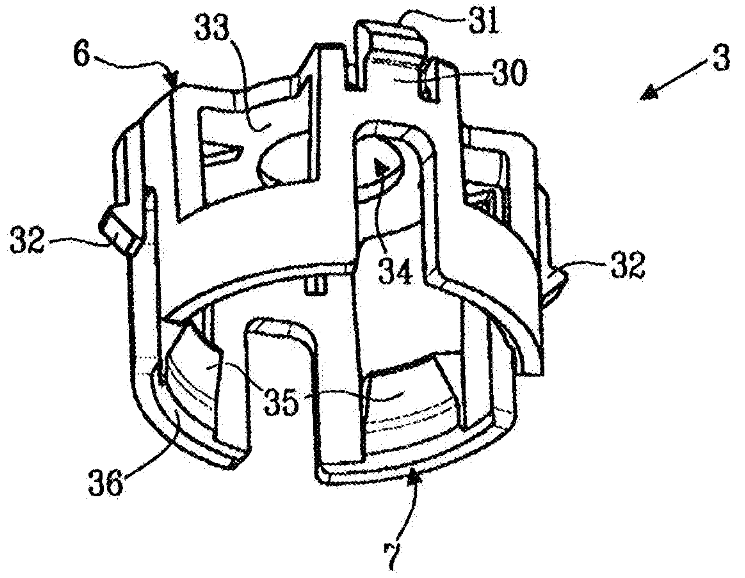
FIG. 2*b* shows a perspective view of a second part of the bottle connector in FIG. 1.

The second part 3 of the bottle connector 1 is shown in FIG. 2*b* and is seen from the second end 7 which is the end that is arranged to be remote from the second end 5 of the first part 2 when the bottle connector 1 is assembled. The second part 3 of the bottle connector 1 comprises two oppositely arranged flexible locking tongues 30 each carrying a locking protrusion 31 which are arranged to cooperate with the first locking openings 17 and the second locking openings 19 on the first part 2 of the bottle connector 1 for locking the bottle connector 1 in the transport configuration and the fluid transfer configuration, respectively.

The second part 3 of the bottle connector 1 further comprises opposing male guiding elements 32 arranged to engage with the guiding grooves 20 on the first part of the bottle connector 1. In the shown embodiment, the male guiding elements 32 together with the locking protrusions 31 also serve to restrict movement of the second part 3 into the first part 2. The dimensioning of the locking protrusions 31 and the guiding elements 32 determines the axial force required to activate the telescopic movement between the first and second parts 2, 3.

As with the coupling members, the configuration of the guiding means and locking members shown in the figures and described herein should not be considered limiting to the bottle connector 1 of the invention. Accordingly, the arrangement may be reversed so that the grooves are arranged on the second part and the protrusions engaging with the grooves are arranged on the first part. Moreover, the number of guiding arrangements and locking members may be different from the two arrangements shown in the figures, such as 1-5 guiding arrangements and 1-5 locking arrangements. The guiding and locking function may be fulfilled within one and the same arrangement. If more than one guiding/locking arrangement is provided, the guiding arrangements are preferably symmetrically arranged. The first end 6 of the second part 3 has an end wall 33 with an end opening 34. When the bottle connector 1 is in the fluid transfer configuration, the end wall 33 of the second part 3 will be in direct contact with the intermediate wall 21 of the first part 2, prohibiting further axial compressive movement of the parts 2, 3 relative each other. In the fluid transfer configuration, the circular sealing flange 25 on the first part 2 of the bottle connector 1 extends through the end opening 34 in the end wall 33 of the second part 3.

The second end 7 of the second part 3 is provided with hook elements 35. The hook elements 35 are configured to fit over a bottle neck to keep the bottle connector 1 locked to the bottle, in order to facilitate application of the bottle connector 1 to a bottle, the side wall of the second part 3 of the bottle connector 1 is divided into flexible tongues 36 that can be slightly bent outwardly as the bottle connector 1 is pressed down over a bottle neck. The flexible tongues 38 may be two or more, such as 2-30 flexible tongues. The hook elements 35 are arranged at the free ends of the flexible tongues 36. Alternatively, the side wall of the second part 3 may be provided with slits extending in the axial direction of the second part 3.

Figure 3B:
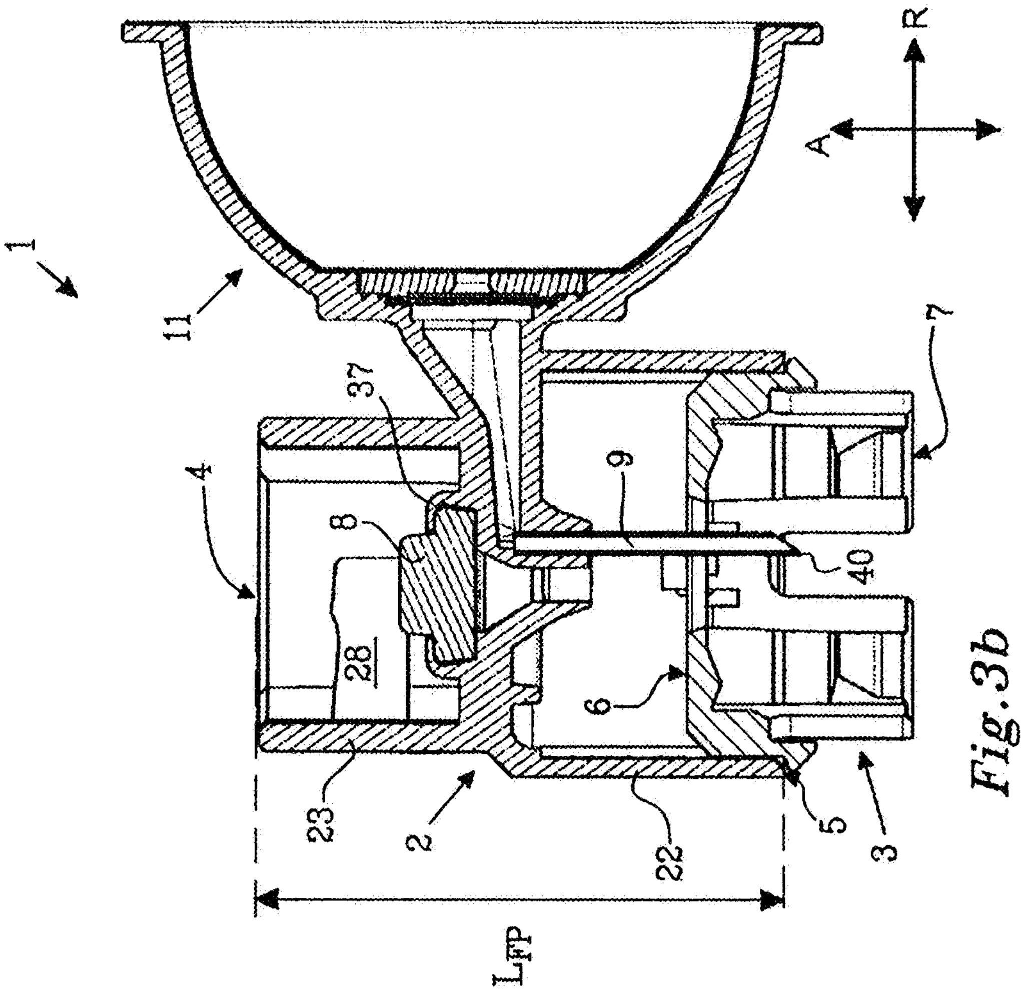
FIG. 3*b* shows a second cross-sectional view of the bottle connector in FIGS. 1 and 2 in a transport configuration and showing a pressure equalizing member.
Figure 3A:
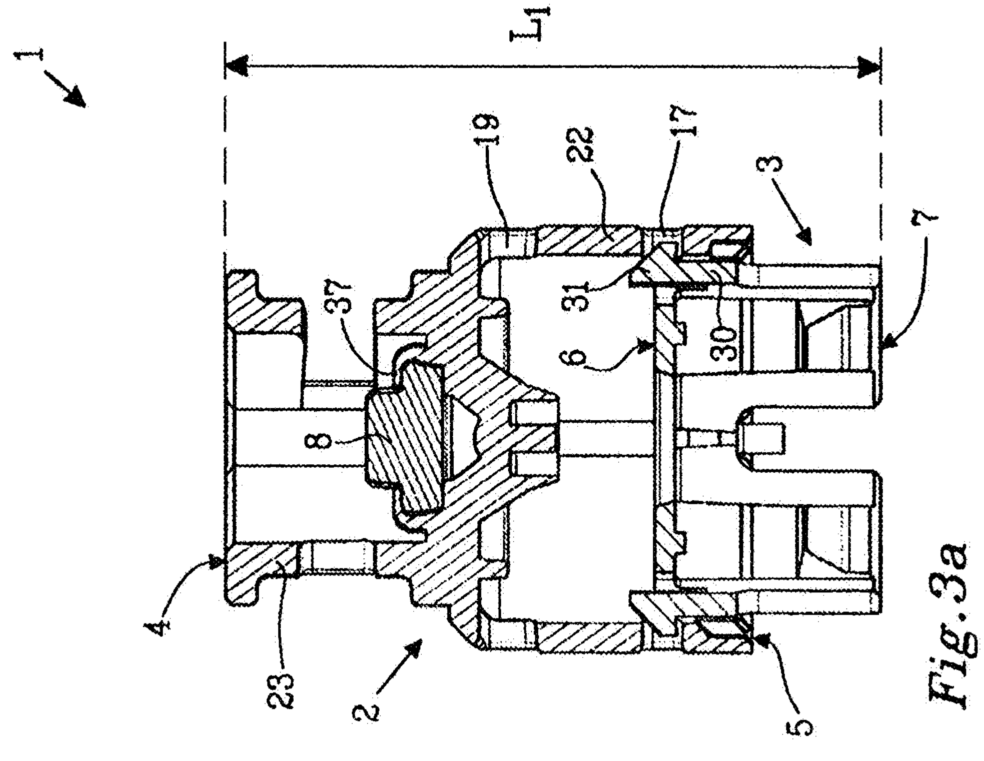
FIG. 3*a* shows a first cross-sectional view of the bottle connector in FIGS. 1 and 2 in a transport configuration and without a pressure equalizing member.

FIGS. 3*a* and 3*b* show the bottle connector 1 as it appears in its assembled state in the transport configuration and having an axial direction A and a radial direction R, perpendicular to the axial direction A. The cross-section in FIG. 3*a* is taken centrally through the bottle connector 1 in a plane through the first locking openings 17 and the second locking openings 19 of the first part 2 of the bottle connector 1. The pressure equalizing member 11 is not seen in FIG. 3*a* as the view is in a direction away from the piercing member 9 and the pressure equalizing member 11. As the piercing member 9 is placed slightly off-set from the central axis through the bottle connector 1 in a direction towards the pressure equalizing member 11, the piercing member 9 is also not visible in FIG. 3*a*. The cross-section in FIG. 3*b* is taken in a plane perpendicular to that in FIG. 3*a* and extends through the pressure equalizing member 11 and the hollow piercing member 9.

In the transport configuration shown in FIGS. 3*a* and 3*b*, the bottle connector 1 has a maximum length $L_1$ in the axial direction of the bottle connector 1. The maximum length $L_1$, is greater than the length $L_{FP}$ of the first part 2 of the bottle connector 1. As is seen in FIG. 3*a*, the second part 3 of the bottle connector 1 extends in the axial direction A past the tip 40 of the piercing member 9 so that the piercing member 9 is completely shielded in the radial direction, R when the bottle connector is in the transport configuration even though the tip 40 of the piercing member 9 protrudes slightly past the second end 5 of the first part 2 of the bottle connector 1.

FIGS. 3*a* and 3*b* show the barrier member 8 mounted in a barrier member holder 37 centrally in the first part 2 of the bottle connector 1.

The first and second parts 2, 3 of the bottle connector 1 are pre-connected by means of the locking protrusions 31 on the flexible locking tongues 30 on the second part 3 being inserted in the first locking openings 17 on the first part 2. The connection between the parts is preferably made so as to prohibit a use from deliberately or accidentally separate the parts 2, 3, but so as to allow deliberate telescopic compression of the parts 2, 3.

Figures 4A, 4B:
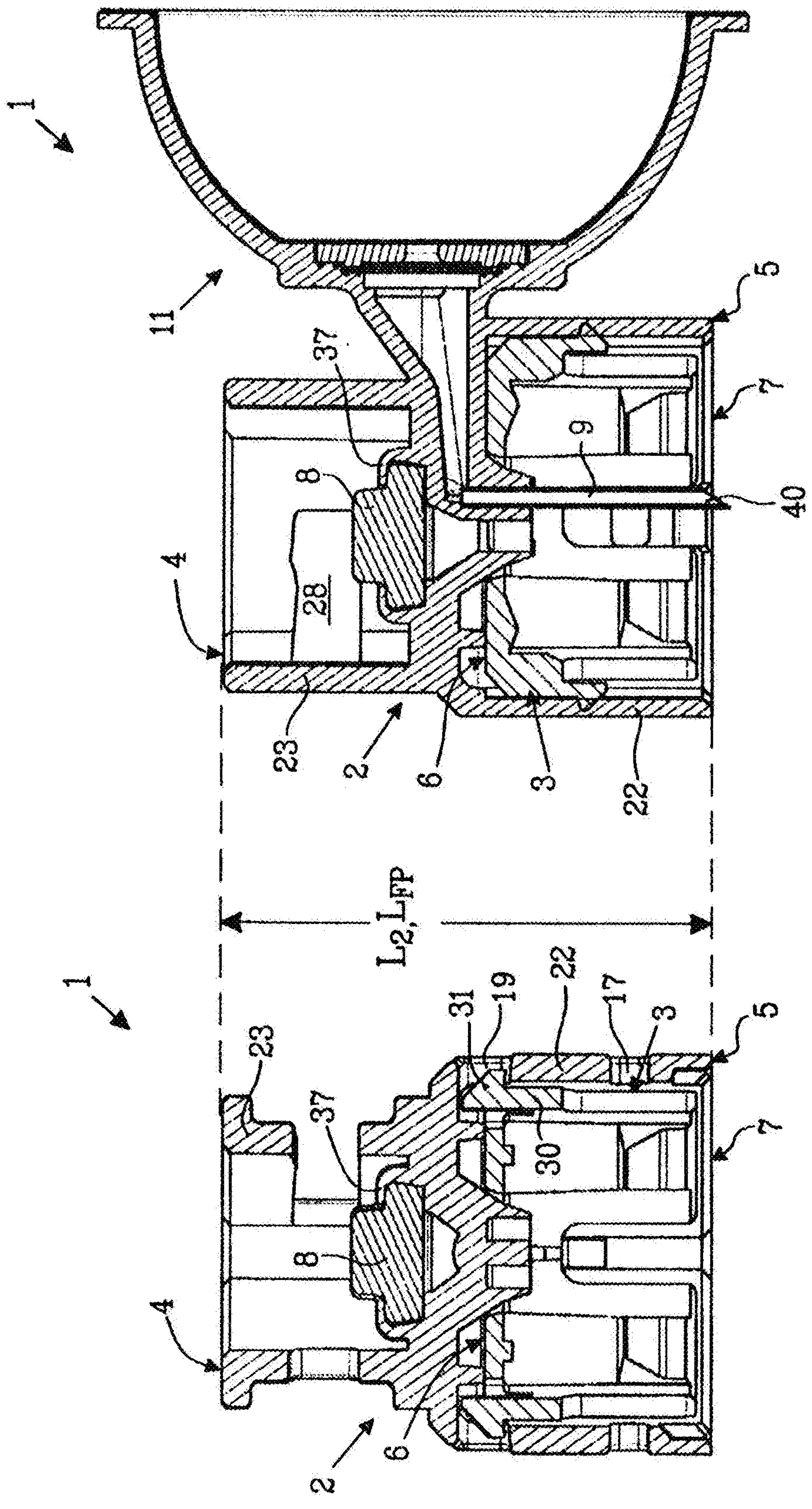
FIG. 4*a* shows a first cross-sectional view of the bottle connector in FIG. 1 in a fluid transfer configuration and without a pressure equalizing member.
FIG. 4*b* shows a second cross-sectional view of the bottle connector in FIGS. 1 and 2 in a fluid transfer configuration and showing a pressure equalizing member.

FIGS. 4*a* and 4*b* show the bottle connector 1 as it appears in its assembled state in the fluid transfer configuration. The cross-sections in FIG. 4*a* and FIG. 4*b* correspond to the cross-sections in FIGS. 3*a* and 3*b*.

In the fluid transfer configuration, the bottle connector 1 has been compressed in the axial direction A, by sliding or pushing the first part 2 of the bottle connector 1 down over the second part 3 of the bottle connector 1 until the first end 8 of the second part 3 of the bottle connector 1 comes into contact with the intermediate wall 21 in the first part 2 of the bottle connector 1 and the locking protrusions 31 on the locking tongues 31 on the second part 3 engage with the second locking openings 19 on the first part 2 of the bottle connector 1. During compression of the bottle connector 1, the guiding grooves 20 on the first part 2 of the bottle connector 1 cooperate with the male guiding elements 5 (protrusions) 32 on the second part of the bottle connector 1 to ensure that the piercing member 9 is guided at a predetermined angle towards and through a bottle stopper. The piercing member 9 is preferably guided at an angle of 90° through the bottle stopper. However, other angles such as an angle of from 85° to 95° are conceivable within the scope of the invention.

The bottle connector 1 in the fluid transfer configuration has a minimum length $L_2$, which is shown to be identical to the length $L_{FP}$ the first part 2 of the bottle connector 1. The minimum length $L_2$ of the bottle connector 1 need not be equal to the length $L_{FP}$ of the first part 2 of the bottle connector 1. However, the minimum length $L_2$ will always be less than the maximum length $L_1$, of the bottle connector 1.

Figure 5A:
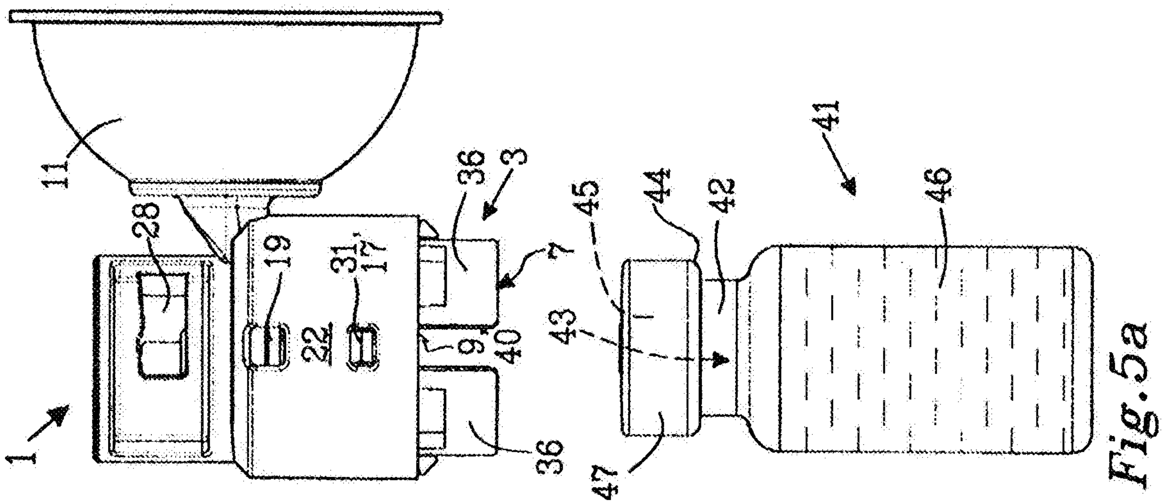
FIGS. 5*a*-5*c* show the bottle connector in FIGS. 1-4 while being applied to a medical bottle; and show an injection device adapted for being connected to the bottle connector in FIGS. 1-4.
Figure 5B:
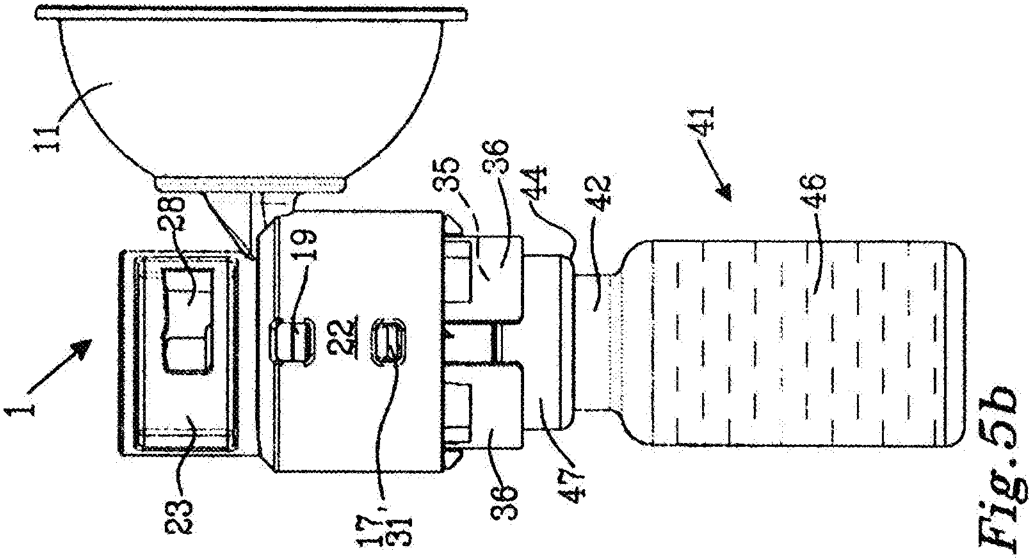
Figure 5C:
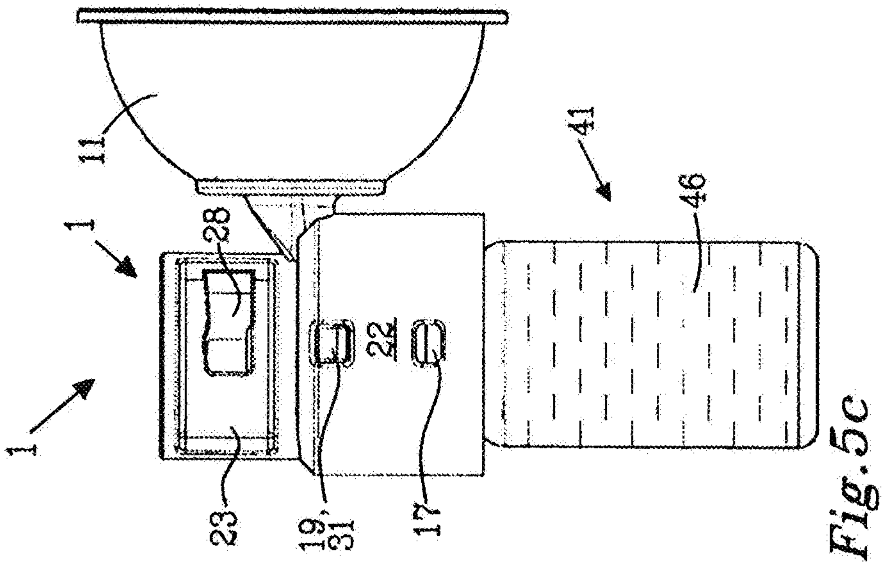

FIGS. 5*a-c* show a bottle connector 1 of the invention in the process of being applied to a medical bottle 41.

The medical bottle 41 or vial is a small glass bottle with a bottle neck 42 and a bottle opening 43. A rim 44 extends around the bottle opening 43 and serves as a receiving connection means that will cooperate with the hook elements 35 at the ends of the flexible tongues 36 on the second part of the bottle connector 1 when the bottle connector 1 is pushed down over the bottle neck 42. A sealing member 45 is inserted into the bottle neck 42 through the bottle opening 43 in order to keep the fluid 46 that is contained in the medical bottle 41 from escaping out through the bottle opening 43. The sealing member 45 is commonly a rubber stopper which may be penetrated by the piercing member 9 of the bottle connector 1 and by an external piercing member such as a syringe. The interface between the sealing member 45 and the rim 44 at the bottle opening 43 is further sealed by means of a protective foil 47 extending around the bottle opening 43 with a first end portion on the exposed surface of the sealing member 45 and a second end portion beneath the rim 44 around the bottle opening 43. Accordingly, the protective foil 47 is wrapped around an edge portion of the upper part of the medical bottle 41, leaving only a circular piercing area of the sealing member 45 exposed at the center of the sealing member 45.

The hook elements 35 on the second part 3 of the bottle connector 1 are configured to fit under the rim 44 around the bottle opening 43 in the medical bottle 41 to keep the bottle connector 1 securely locked in position over the bottle opening 43.

FIG. 5*a* shows the bottle connector 1 and the medical bottle 41 just before the bottle connector 1 is brought into contact with the bottle 41. The tip 40 of the piercing member 9 can be seen to protrude slightly past the edge of the second end 5 of the first part 2 of the bottle connector 1 but not past the edge of the second end 7 of the second part 3 of the bottle connector.

FIG. 5*b* shows the bottle connector 1 and the medical bottle 41 in the process of being pressed down onto the medical bottle 41 but before the hook elements 35 on the flexible tongues at the second end 7 of the second part of the bottle connector 1 have snapped into engagement with the rim 44 at the bottle neck 42.

While applying the second part 3 of the bottle connector 1 over the bottle neck 42, the bottle connector 1 is kept in the transport configuration by means of the locking protrusions 31 on the locking tongues 30 on the second part 3 of the bottle connector 1 being engaged with the first locking openings 17 in the first part 2 of the bottle connector 2.

After coupling of the bottle connector 1 to the bottle neck 42, the piercing member 9 on the first part of the bottle connector 1 is brought to penetrate the sealing member 45 in the bottle opening 43 by telescopically sliding or pushing the first part 2 in relation to the second part 3 and bringing the connecting device to assume the fluid transfer configuration shown in FIG. 5*c* and described in detail in connection with FIGS. 4*a* and 4*b*.

When the bottle connector 1 has been securely fixed to the medical bottle 41 and has been brought into the fluid transfer configuration, the piercing member 9 penetrates all the way through the sealing member 45 in the bottle opening 43 so that air and gas may pass from the medical bottle 41 through the piercing member 9 and further into the pressure equalizing member 11. The two-part telescopic construction of the bottle connector 1 allows safe and controlled handling and application also of bottle connectors having piercing members of comparatively greater length. The pre-connection between the first and second parts of the bottle connector 1 ascertains simple handling of the bottle connector 1 and ascertains proper alignment of the parts and of the piercing member 9.

FIG. 6 shows an example of a medical device that may be used together with a bottle connector 1 according to the invention. The medical device in FIG. 6 is an injection device 48 adapted for being connected to the bottle connector in FIGS. 1-5 by means of male locking members 49 designed to mate with the female members of the bayonet fitting 28 on the bottle connector 1. The injection device 48 has an internal needle (not visible in FIG. 8) and is provided with a barrier member 50 that will be in close contact with the barrier member 8 in the bottle connector 1 when the injection device 48 is connected to the bottle connector 1, thus creating a double barrier for the internal needle to penetrate before passing down through the sealing member 45 in the medical bottle 41 and further down into the fluid contained in the medical bottle 41.

Further modifications of the invention within the scope of the claims would be apparent to a skilled person. For instance, the locking and guiding mechanisms disclosed herein may be differently designed and configured without deviating from the invention.

The invention claimed is:

1. A bottle connector for use in a medical fluid transfer arrangement, said bottle connector having an axial direction and a radial direction and comprising:

a first generally cylindrical part having a first end a second end, said first generally cylindrical part comprising:

a hollow piercing member comprising an inner channel, and a pressure equalizing member in fluid communication with the hollow piercing member; and a second generally cylindrical part connected to the first generally cylindrical part, the second generally cylindrical part having a first end and a second end, the second generally cylindrical part comprising a bottle coupling member, for coupling said bottle connector to a medical bottle, the second generally cylindrical part being configured to move between a transport configuration and a fluid transfer configuration, wherein one of the first and second generally cylindrical parts comprises a locking tongue carrying a locking protrusion, wherein the other of the first and second generally cylindrical parts comprises a sidewall with a first locking opening and a second locking opening therein, the second locking opening axially spaced from the first locking opening, wherein the locking protrusion is arranged to cooperate with the first and second locking openings to lock the bottle connector in the transport configuration and the fluid transfer configuration, respectively, wherein the second generally cylindrical part is configured to initially couple to the first generally cylindrical part by moving along a longitudinal axis without simultaneous rotation between the first and second generally cylindrical parts, and wherein when the second generally cylindrical part moves from the transport configuration to the fluid transfer configuration, the second generally cylindrical part moves along a longitudinal axis without simultaneous rotation between the first and second generally cylindrical parts.

2. The bottle connector according to claim 1, wherein the other of the first and second generally cylindrical parts comprises a guiding groove and the one of the first and second generally cylindrical parts comprises a guiding element arranged to engage with the guiding groove.

3. The bottle connector according to claim 2, wherein the first generally cylindrical part comprises the guiding groove and the second generally cylindrical part comprises the guiding element.

4. The bottle connector according to claim 2, wherein the hollow piercing member protrudes past the second end of the first generally cylindrical part.

5. The bottle connector according to claim 1, wherein, when the second generally cylindrical part moves from the transport configuration to the fluid transfer configuration, the locking protrusion initially deflects inwardly toward a longitudinal axis of the second generally cylindrical part.

6. The bottle connector according to claim 1, wherein said first part carries a barrier member, said barrier member being mounted in a barrier member holder centrally in said first part.

7. The bottle connector according to claim 1, wherein said first part comprises means for connecting said first part to a medical device.

8. The bottle connector according to claim 1, wherein said first and second parts of said bottle connector comprise cooperating guiding members for guiding said piercing member through said sealing member of said bottle at a predetermined angle.

9. The bottle connector according to claim 1, wherein said pressure equalizing member comprises a pressure regulating chamber having a pressure adapting volume and comprising a filter between said pressure regulating chamber and said piercing member.

10. The bottle connector according to claim 1, wherein said piercing member is aligned with a central axis of said bottle connector and is placed along said central axis or not more than 3 mm from said central axis as measured in a radial direction of said bottle connector.

11. The bottle connector according to claim 1, wherein said first generally cylindrical part further has an intermediate portion disposed between the first end and the second end; wherein the hollow piercing member further comprises a proximal end and a distal end disposed opposite and distal the proximal end; and wherein the proximal end is disposed at said intermediate portion.

12. The bottle connector according to claim 11, wherein the proximal end of said hollow piercing member is disposed generally midway between the first and second ends of said first generally cylindrical part.

13. A bottle connector for use in a medical fluid transfer arrangement, said bottle connector having an axial direction and a radial direction and comprising:

a first generally cylindrical part having a first end a second end, said first generally cylindrical part comprising a hollow piercing member comprising an inner channel; and a second generally cylindrical part connected to the first generally cylindrical part, the second generally cylindrical part having a first end and a second end, said second generally cylindrical part comprising a bottle coupling member, for coupling said bottle connector to a medical bottle, wherein the second generally cylindrical part is configured to initially couple to the first generally cylindrical part by moving along a longitudinal axis without simultaneous rotation between the first and second generally cylindrical parts, wherein the second generally cylindrical part is configured to move between a transport configuration and a fluid transfer configuration by moving along a longitudinal axis without simultaneous rotation between the first and second generally cylindrical parts, and wherein the bottle connector further comprises a locking member that releasably locks the second generally cylindrical part in the transport configuration and prevents axial compression between the first generally cylindrical part and the second generally cylindrical part.

14. The bottle connector according to claim 13, wherein one of the first and second generally cylindrical parts comprises a guiding groove and the other of the first and second generally cylindrical parts comprises a guiding element arranged to engage with the guiding groove.

15. The bottle connector according to claim 14, wherein the first generally cylindrical part comprises the guiding groove and the second generally cylindrical part comprises the guiding element.

16. The bottle connector according to claim 13, wherein said bottle connector comprises a pressure equalizing member.

17. The bottle connector according to claim 16, wherein said pressure equalizing member comprises a pressure regulating chamber having a pressure adapting volume and being in fluid communication with said piercing member and comprising a filter between said pressure regulating chamber and said piercing member.

* * * * *